United States Patent
Zheng et al.

(10) Patent No.: US 12,494,833 B2
(45) Date of Patent: Dec. 9, 2025

(54) CHANNEL STATE INFORMATION REPORTING

(71) Applicant: Nokia Technologies Oy, Espoo (FI)

(72) Inventors: Naizheng Zheng, Beijing (CN); Kamakshi Lakshminarayanapuram Krishnakumar, Espoo (FI); Daniela Laselva, Aalborg (DK); Matha Deghel, Massy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/912,021

(22) Filed: Oct. 10, 2024

(65) Prior Publication Data
US 2025/0070839 A1 Feb. 27, 2025

Related U.S. Application Data

(63) Continuation of application No. 18/781,426, filed on Jul. 23, 2024.

(51) Int. Cl.
*H04B 7/06* (2006.01)
*H04W 52/02* (2009.01)
(Continued)

(52) U.S. Cl.
CPC ...... *H04B 7/0626* (2013.01); *H04W 52/0206* (2013.01); *H04W 72/21* (2023.01); *H04W 72/566* (2023.01)

(58) Field of Classification Search
CPC ... H04B 7/0626; H04W 72/21; H04W 72/566
(Continued)

(56) References Cited

U.S. PATENT DOCUMENTS 8,520,491 B2 * 8/2013 Lunttila ............... H04L 1/0026
370/203
10,708,802 B2 * 7/2020 Lunttila ............. H04W 72/044
(Continued)

FOREIGN PATENT DOCUMENTS

| CN | 111836309 A | 10/2020 |
| CN | 114008947 A | 2/2022 |

(Continued)

OTHER PUBLICATIONS

"New WID: Network energy savings for NR", 3GPP TSG RAN Meeting #98-e, RP-223540, Agenda: 9.1.1, Huawei, Dec. 12-16, 2022, pp. 1-6.

(Continued)

*Primary Examiner* — Chi Tang P Cheng
(74) *Attorney, Agent, or Firm* — Nokia Technologies Oy

(57) ABSTRACT

Example embodiments of the present disclosure relate to applying timing advance during random access procedure. The first apparatus transmits, to a first apparatus, a channel state information (CSI) report configuration comprising a first sub-configuration and a second sub-configuration; and receives, from the first apparatus and based at least in part on the first and second first priority reporting levels, a CSI report associated with at least one of the first sub-configuration or the second sub-configuration. Impacts to the other CSI reporting caused by introducing the sub-configuration would be minimized.

18 Claims, 6 Drawing Sheets

(51) Int. Cl.
*H04W 72/21* (2023.01)
*H04W 72/566* (2023.01)

(58) Field of Classification Search
USPC .......................................... 370/311
See application file for complete search history.

(56) References Cited

U.S. PATENT DOCUMENTS

| | | | |
|---|---|---|---|
| 2021/0083743 A1 | 3/2021 | Faxer et al. | |
| 2021/0297225 A1 | 9/2021 | Marinier et al. | |
| 2023/0120578 A1* | 4/2023 | Khoshnevisan | H04L 1/0027 370/329 |
| 2024/0396606 A1* | 11/2024 | Hu | H04L 5/0057 |

FOREIGN PATENT DOCUMENTS

| | | | |
|---|---|---|---|
| CN | 114303325 A | | 4/2022 |
| WO | 2020/143022 A1 | | 7/2020 |
| WO | 2022/229925 A1 | | 11/2022 |

OTHER PUBLICATIONS

"3rd Generation Partnership Project; Technical Specification Group Radio Access Network; NR; Physical layer procedures for data (Release 17)", 3GPP TS 38.214, V17.6.0, Jun. 2023, pp. 1-231.

"3rd Generation Partnership Project; Technical Specification Group Radio Access Network; NR; Multiplexing and channel coding (Release 17)", 3GPP TS 38.212, V17.5.0, Mar. 2023, pp. 1-203.

"Discussion Summary for energy saving techniques of NW energy saving SI", 3GPP TSG RAN WG1 Meeting #110-bis-e, R1-220xxxx, Agenda: 9.7.2, Intel Corporation, Oct. 10-19, 2022, 82 pages.

IEEE 802.11, Wikipedia, Retrieved on Oct. 22, 2024, Webpage available at : https://en.wikipedia.org/wiki/IEEE_802.11.

International Search Report and Written Opinion received for corresponding Patent Cooperation Treaty Application No. PCT/CN2023/112655, dated Apr. 30, 2024, 8 pages.

"Summary of views on CSI reporting v1", 3GPP TSG-RAN WG1 Meeting #94, R1-1809724, Agenda: 7.1.2.2, Ericsson, Aug. 20-24, 2018, pp. 1-34.

Extended European Search Report received for corresponding European Patent Application No. 24191359.9, dated Jan. 8, 2025, 9 pages.

"Final FL summary for SD and PD adaptation for R18 NES", 3GPP TSG-RAN WG1 Meeting #113, R1-2306034, Agenda: 9.7.1, Huawei, May 22-26, 2023, 75 Pages.

"Discussion on NES techniques in spatial and power domains", 3GPP TSG RAN WG1 #112bis-e Meeting, R1-2303426, Agenda: 9.7.1, LG Electronics, Apr. 17-26, 2023, 16 Pages.

"Discussion on NES techniques in spatial and power domains", 3GPP TSG RAN WG1 #113, R1-2305143, Agenda: 9.7.1, LG Electronics, May 22-26, 2023, 21 Pages.

* cited by examiner

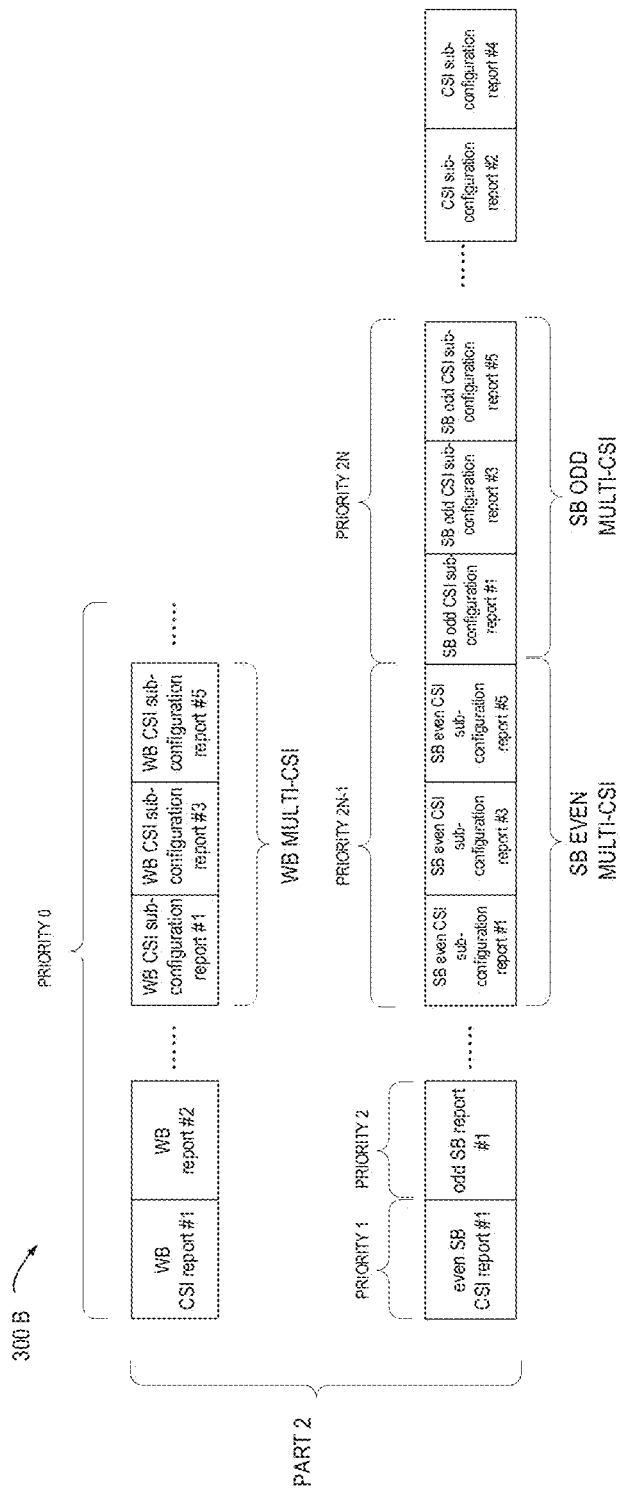

CHANNEL STATE INFORMATION REPORTING

RELATED APPLICATIONS

This application is a 37 C.F.R. § 1.53(b) continuation of co-pending U.S. patent application Ser. No. 18/781,426 filed Jul. 23, 2024, which claims priority to PCT Application No. PCT/CN2023/112655, filed on Aug. 11, 2023, which is incorporated herein by reference in its entirety

FIELDS

Various example embodiments of the present disclosure generally relate to the field of telecommunication and in particular, to methods, devices, apparatuses and computer readable storage medium for channel state information (CSI) reporting.

BACKGROUND

In release 18 of the 3rd generation partnership project (3GPP), for network energy saving (NES) for new radio (NR), one of the objectives is to specify spatial domain adaptation using different antenna elements and CSI-ports. When UEs are configured with multiple spatial domain adaptation patterns, the UEs may report CSI for these patterns.

So far, some agreements on CSI report configuration for spatial domain adaptation framework have been reached, where a CSI report configuration may be used for spatial domain adaptation purpose, with including of multiple CSI report sub-configurations, and each sub-configuration corresponds to one spatial adaptation pattern. And the UE performs the CSI report for each of the sub-configuration within the CSI report configuration. As the transmission resources configured for CSI reporting are limited, how to report the CSI associated with multiple CSI report sub-configurations is desirable to be further discussed.

SUMMARY

In a first aspect of the present disclosure, there is provided a first apparatus. The first apparatus comprises at least one processor; and at least one memory storing instructions that, when executed by the at least one processor, cause the first apparatus at least to: receive, from a second apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and transmit, to the second apparatus and based at least in part on the first and second first priority reporting levels, a CSI report associated with at least one of the first sub-configuration or the second sub-configuration.

In a second aspect of the present disclosure, there is provided a second apparatus. The second apparatus comprises at least one processor; and at least one memory storing instructions that, when executed by the at least one processor, cause the second apparatus at least to: transmit, to a first apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and receive, from the first apparatus and based at least in part on the first and second first priority reporting levels, a CSI report associated with at least one of the first sub-configuration or the second sub-configuration.

In a third aspect of the present disclosure, there is provided a method. The method comprises: receiving, at a first apparatus and from a second apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and transmitting, to the second apparatus and based at least in part on the first and second first priority reporting levels, a CSI report associated with at least one of the first sub-configuration or the second sub-configuration.

In a fourth aspect of the present disclosure, there is provided a method. The method comprises: transmitting, at a second apparatus and to a first apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and receiving, from the first apparatus and based at least in part on the first and second first priority reporting levels, a CSI report associated with at least one of the first sub-configuration or the second sub-configuration.

In a fifth aspect of the present disclosure, there is provided a first apparatus. The first apparatus comprises means for receiving, at a first apparatus and from a second apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and means for transmitting, to the second apparatus and based at least in part on the first and second first priority reporting levels, a CSI report associated with at least one of the first sub-configuration or the second sub-configuration.

In a sixth aspect of the present disclosure, there is provided a second apparatus. The second apparatus comprises means for transmitting, at a second apparatus and to a first apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and means for receiving, from the first apparatus and based at least in part on the first and second first priority reporting levels, a CSI report associated with at least one of the first sub-configuration or the second sub-configuration.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 3B illustrates an example structure of CSI part 2;

Throughout the drawings, the same or similar reference numerals represent the same or similar element.

DETAILED DESCRIPTION

Figure 1:
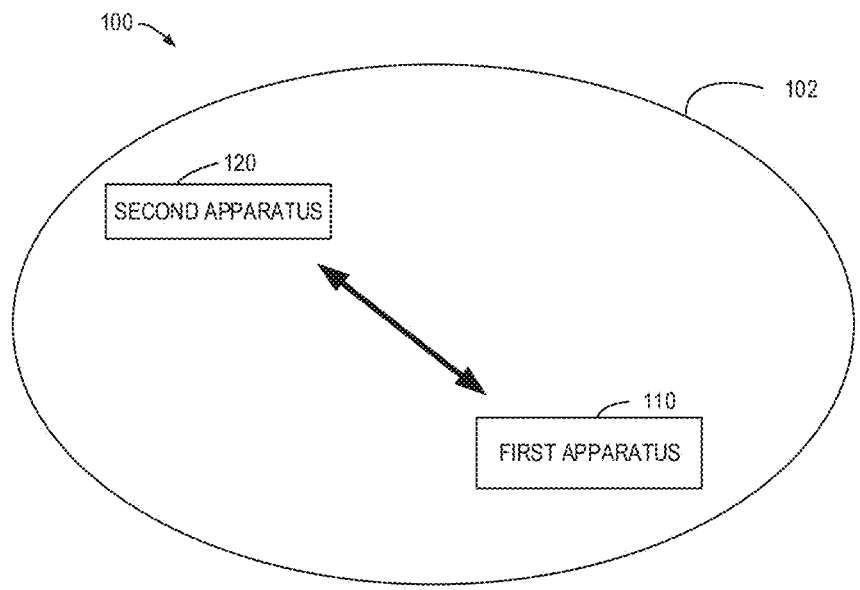
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like.

In the following, a resource in time domain will be used as an example of a resource for describing some example embodiments of the present disclosure. It is noted that example embodiments of the present disclosure are equally applicable to other resources in other domains. In summary, the resource used herein includes but is not limited to a time resource or a frequency resource, for example, a subband non-overlapping full duplex time resource, a dynamic time division duplexing time resource, a full duplex evolution time resource, a sub-band, a sub-carrier, or a resource element (RE).

Generally speaking, during the communication between the terminal device and the network device, the terminal device needs to report CSI feedback to the network device, such that the network device may understand the transmission channel condition and make a more proper decision on subsequent packet scheduling, modulation and coding adaptation, and multiple-input multiple-output (MIMO) related transmission adaptation. In the legacy specification, only the level of CSI report configuration was specified, where the mapping order of CSI fields is within one CSI report. More details about how to map the CSI fields of one CSI reported are discussed as below.

If only wideband channel quality indicator (CQI)/precoding matrix indicator (PMI) is to be reported: i.e., when the physical uplink control channel (PUCCH) carries Type I CSI with wideband frequency granularity, the CSI payload carried by the PUCCH format 2 and PUCCH formats 3, or 4 are identical and the same irrespective of rank indicator (RI) (if reported), CSI-RS resource indicator (CRI) (if reported).

Below table 1 illustrates an example mapping order of CSI fields of one CSI report.

TABLE 1

| CSI report number | CSI fields |
| --- | --- |
| CSI report #n | CRI, if reported<br>Rank Indicator, if reported<br>Layer Indicator, if reported<br>Zero padding bits $O_P$, if needed<br>PMI wideband information fields $X_1$, from left to right, if reported<br>PMI wideband information fields $X_2$, from left to right, or codebook index for 2 antenna ports, if reported<br>Wideband CQI for the first TB, if reported<br>Wideband CQI for the second TB, if reported |

In table 1, pmi-FormatIndicator=widebandPMI and cqi-FormatIndicator=widebandCQI or reportQuantity set to 'cri-RI-CQI' and cqi-FormatIndicator=widebandCQI.

Further, if subband CQI/PMI also needs to be reported together with wideband CQI/PMI: i.e., for type I CSI sub-band reporting on PUCCH formats 3, or 4, the payload is split into two parts. The first part contains RI (if reported), CRI (if reported), CQI for the first codeword. The second part contains PMI (if reported), LI (if reported) and contains the CQI for the second codeword (if reported) when RI>4.

Below table 2 illustrates another example mapping order of CSI fields of one CSI report, CSI part 1, where pmi-FormatIndicator=subbandPMI or cqi-FormatIndicator=subbandCQI.

TABLE 2

| CSI report number | CSI fields |
| --- | --- |
| CSI report #n<br>CSI part 1 | CRI, if reported<br>Rank Indicator, if reported<br>Wideband CQI for the first TB, if reported<br>Subband differential CQI for the first TB with increasing order of subband number, if reported<br>Indicator of the number of non-zero wideband amplitude coefficients $M_0$ for layer 0, if reported<br>Indicator of the number of non-zero wideband amplitude coefficients $M_1$ for layer 1 (if the rank according to the reported RI is equal to one, this field is set to all zeros), if 2-layer PMI reporting is allowed according to the rank restriction and if reported |

Note:
Subbands for given CSI report n indicated by the higher layer parameter csi-ReportingBand with value set to '1' are numbered continuously in the increasing order with the lowest subband of csi-ReportingBand with value set to '1' as subband 0.

Below table 3 illustrates a further example mapping order of CSI fields of one CSI report, CSI part 2 wideband, where pmi-FormatIndicator=subbandPMI or cqi-FormatIndicator=subbandCQI.

TABLE 3

| CSI report number | CSI fields |
| --- | --- |
| CSI report #n<br>CSI part 2<br>wideband | Wideband CQI for the second TB, if present and reported<br>Layer Indicator, if reported<br>PMI wideband information fields $X_1$, from left to right, if reported<br>PMI wideband information fields $X_2$, from left to right, or codebook index for 2 antenna ports, if pmi-FormatIndicator = widebandPMI and if reported |

Below table 4 illustrates a further example Mapping order of CSI fields of one CSI report, CSI part 2 subband, where pmi-FormatIndicator=subbandPMI or cqi-FormatIndicator=subbandCQI.

TABLE 4

| CSI report #n Part 2 subband | Subband differential CQI for the second TB of all even subbands with increasing order of subband number, if cqi-FormatIndicator = subbandCQI and if reported<br>PMI subband information fields $X_2$ of all even subbands with increasing order of subband number, from left to right, or codebook index for 2 antenna ports of all even subbands with increasing order of subband number, if pmi-FormatIndicator = subbandPMI and if reported<br>Subband differential CQI for the second TB of all odd subbands with increasing order of subband number, if cqi-FormatIndicator = subbandCQI and if reported<br>PMI subband information fields $X_2$ of all odd subbands with increasing order of subband number, from left to right, or codebook index for 2 antenna ports of all odd subbands with increasing order of subband number, if pmi-FormatIndicator = subbandPMI and if reported |
| --- | --- |

In some embodiments, subbands for given CSI report n indicated by the higher layer parameter csi-ReportingBand with value set to '1' are numbered continuously in the increasing order with the lowest subband of csi-ReportingBand with value set to '1' as subband 0.

If none of the CSI reports for transmission on a PUCCH is of two parts, the mapping order of CSI reports to UCI bit sequence is specified with the following table 5.

TABLE 5

| UCI bit sequence | CSI report number |
| --- | --- |
| $a_0$ | CSI report #1 |
| $a_1$ | CSI report #2 |
| $a_2$ | ... |
| $a_3$ | CSI report #n |
| $\vdots$ | |
| $a_{A-1}$ | |

The above table5 illustrates an example mapping order of CSI reports to UCI bit sequence $a_0, a_1, a_2, a_3, \ldots, a_{A-1}$, without two-part CSI report(s). Further, in table 5, if at least one of the CSI reports for transmission on a PUCCH is of two parts, two UCI bit sequences are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots a_{A^{(2)}-1}^{(2)}$. The CSI fields of all CSI reports, in the order from upper part to lower part in Table 6.3.1.1.2-13, are mapped to the UCI bit sequence $a_0^{(1)}, a_1^{(1)}, a_2^{(1)}, a_3^{(1)}, \ldots, a_{A^{(1)}-1}^{(1)}$ starting with $a_0^1$. The most significant bit of each field is mapped to the lowest order information bit for that field, e.g., the most significant bit of the first field is mapped to $a_0^{(1)}$. The CSI fields of all CSI reports, in the order from upper part to lower part in Table 6.3.1.1.2-14, are mapped to the UCI bit sequence $a_0^{(2)}, a_1^{(2)}, a_2^{(2)}, a_3^{(2)}, a_3^{(2)}, \ldots, a_{A^{(2)}-1}^{(2)}$ starting with $a_0^{(2)}$. The most significant bit of each field is mapped to the lowest order information bit for that field, e.g., the most significant bit of the first field is mapped to $a_0^{(2)}$. If the length of UCI bit sequence $a_0^{(2)}, a_1^{(2)}, a_2^{(2)}, a_3^{(2)}, \ldots, a_{A^{(2)}-1}^{(2)}$ is less than 3 bits, zeros shall be appended to the UCI bit sequence until its length equals 3.

If at least one of the CSI reports for transmission on a PUCCH is of two parts, two UCI bit sequences are generated, the mapping order of CSI reports to UCI bit sequence is specified with the following table 6.

TABLE 6

| UCI bit sequence | CSI report number |
|---|---|
| $a_0^{(1)}$ | CSI report #1 if CSI report #1 is not of two parts, or CSI report #1, CSI part 1, if CSI report #1 is of two parts |
| $a_1^{(1)}$ | |
| $a_2^{(1)}$ | CSI report #2 if CSI report #2 is not of two parts, or CSI report #2, CSI part 1, if CSI report #2 is of two parts |
| $a_3^{(1)}$ | |
| ⋮ | ... |
| $a_{A^{(1)}-1}^{(1)}$ | CSI report #n if CSI report #n is not of two parts, or CSI report #n, CSI part 1, if CSI report #n is of two parts |

The above table 6 illustrates an example mapping order of CSI reports to UCI bit sequence $a_0^{(1)}$, $a_1^{(1)}$, $a_2^{(1)}$, $a_3^{(1)}$, ..., $a_{A^{(1)}-1}^{(1)}$, with two-part CSI report(s). In table 6, CSI report #1, CSI report #2, ..., CSI report #n correspond to the CSI reports in increasing order of CSI report priority values.

Below table 7 illustrates an example mapping order of CSI reports to UCI bit sequence $a_0^{(2)}$, $a_1^{(2)}$, $a_2^{(2)}$, $a_3^{(2)}$, ..., $a_{A^{(2)}-1}^{(2)}$, with two-part CSI report(s).

TABLE 7

| UCI bit sequence | CSI report number |
|---|---|
| $a_0^{(2)}$ | CSI report #1, CSI part 2 wideband, if CSI part 2 exists for CSI report #1 |
| $a_1^{(2)}$ | CSI report #2, CSI part 2 wideband, if CSI part 2 exists for CSI report #2 |
| $a_2^{(2)}$ | |
| $a_3^{(2)}$ | ... |
| ⋮ | CSI report #n, CSI part 2 wideband, if CSI part 2 exists for CSI report #n |
| $a_{A^{(2)}-1}^{(2)}$ | CSI report #1, CSI part 2 subband, if CSI part 2 exists for CSI report #1 |
| | CSI report #2, CSI part 2 subband, if CSI part 2 exists for CSI report #2 |
| | ... |
| | CSI report #n, CSI part 2 subband, if CSI part 2 exists for CSI report #n |

In table 7, CSI report #1, CSI report #2, ..., CSI report #n correspond to the CSI reports in increasing order of CSI report priority values.

It can be seen, for CSI reports transmitted on a PUCCH, if all CSI reports consist of one part, the UE may omit a portion of CSI reports. Omission of CSI is according to the priority order determined from a priority value. CSI report is omitted beginning with the lowest priority level until the CSI report code rate is less or equal to the one configured by the higher layer parameter maxCodeRate.

If any of the CSI reports consist of two parts, the UE may omit a portion of Part 2 CSI. Omission of Part 2 CSI may be performed according to the priority order. Part 2 CSI is omitted beginning with the lowest priority level until the Part 2 CSI code rate is less or equal to the one configured by higher layer parameter maxCodeRate.

As discussed above, it has been agreed that the CSI report configuration for spatial domain adaptation framework is supported, where a CSI report configuration may be used for spatial domain adaptation purpose, with including of multiple CSI report sub-configurations, and each sub-configuration corresponds to one spatial adaptation pattern.

With introducing of the "sub-configuration" in a CSI report configuration, how the corresponding uplink control information (UCI) mapping and prioritizing should be handled is one of the aspects of this feature that require to be addressed.

Regarding how to support the sub-configuration based CSI reporting, some implementations may be performed.

For N(>1) CSIs reporting based on a CSI report configuration, CSI mapping order for CSI Part 1 or Part 2 and CSI omission/priority rule may be performed per CSI report. Specifically, as for CSI Part 1, CSI quantities, such as, CSI reference signal (CSI-RS) resource index (CRI), rank indicator (RI) and channel quality indicator (CQI) when applicable) corresponding to all of N sub-configurations are multiplexed into a single CSI Part 1, mapping order may be determined as, e.g., CSI quantity first and sub-configuration index second, or sub-configuration index first and CSI quantity second. As for CSI Part 2, two priority reporting levels may be allocated to a CSI report, where each priority reporting level is determined as e.g., even subbands of all N sub-configurations for the priority reporting level and odd subbands of all N sub-configurations for the second priority reporting level), and legacy mechanism can be reused may be used for CSI omission.

Alternatively, for N(>1) CSIs reporting based on a CSI report configuration, CSI mapping order for CSI Part 1 or Part 2 and CSI omission/priority rule may be performed per sub-configuration. Specifically, as for CSI Part 1, CSI quantities (such as CRI, RI and CQI when applicable) corresponding to each sub-configuration is separately generated then concatenated into a single bit sequence for CSI part 1 for the CSI report configuration. As for CSI part 2, two priority reporting levels may be allocated to each sub-configuration, i.e., 2×N priority reporting levels in total. Further, for CSI omission/priority rule, sub-configuration index needs to be additionally considered, the priority value may be determine as $Pri_{iCSI}$, (y, k, c, s, q)=$2 \cdot q_{max} \cdot N_{cells} \cdot M_s \cdot y + q_{max} \cdot N_{cells} \cdot M_s \cdot k + q_{max} \cdot M_s \cdot c + q_{max} \cdot s + q$, where q is the sub-configuration index and $q_{max}$ is the maximum number of sub-configuration indexes in a CSI report configuration, y=0 for aperiodic CSI reports to be carried on PUSCH, y=1 for semi-persistent CSI reports to be carried on PUSCH, y=2 for semi-persistent CSI reports to be carried on PUCCH and y=3 for periodic CSI reports to be carried on PUCCH; k=0 for CSI reports carrying L1-RSRP or L1-SINR and k=1 for CSI reports not carrying L1-RSRP or L1-SINR; c is the serving cell index and $N_{cells}$ is the value of the higher layer parameter maxNrofServingCells; s is the reportConfigID and $M_s$ is the value of the higher layer parameter maxNrofCSI-ReportConfigurations.

Alternatively, for N(>1) CSIs reporting based on a CSI report configuration, CSI mapping order for CSI Part 1 or Part 2 and CSI omission/priority rule may be performed as below. As for CSI Part 1, CSI quantities (such as CRI, RI and CQI when applicable) associated with a reference sub-configuration may be included, where a reference sub-configuration, for example, may be the sub-configuration with the largest number of antenna ports based on the corresponding ($N_1$, $N_2$) values, wherein $N_1$ is the antenna (port) number of a first dimension, and $N_2$ is the antenna (port) number of a second dimension. Further, as for CSI Part 2, the remaining CSI quantities for the reference sub-configuration (e.g., PMI, L1), and (N−1) CSIs for the remaining sub-configurations may be included.

It is noted that if CSI payload reduction is supported, the payload for a corresponding CSI quantity is determined as, e.g., omitted, differentiated and so on.

For the aperiodic and semi-persistent CSI report, there is an option for gNB requesting CSI report for only a subset of total configured spatial domain adaptation patterns (e.g., for a CSI report configuration, a UE may be configured with total of L sub-configurations, where each sub-configuration maps to a spatial adaptation pattern, and the UE can be indicated via downlink control information (DCI) or medium access control control element (MAC-CE) to make the CSI report for N out of total L adaptation patterns, i.e. 2 out of total 5 configured spatial domain adaptation patterns to be reported by UE).

However, for periodic CSI report, based on the current agreement reached, the UE has to report all configured L sub-configurations corresponding to different patterns in a reporting occasion. Although for the implementation, it is not completely sure that how many patterns with sub-configurations could be considered as more suitable and helpful with quick adaptations. Practically, the PUCCH capacity carrying UCI can be rather limited. And the increasing number of patterns should not harm the existing (legacy) CSI report for the main configuration of other operations. And hence the existing CSI-report priority should not be largely disturbed due to reports from multiple adaptation pattern.

If CSI mapping order is performed based on sub-configuration and new CSI report priority rule, the legacy manner and legacy CSI report priority rule should be re-defined, which is undesirable. Thus, it is preferred that the CSI mapping order may be performed per CSI report, and thus the legacy manner and legacy CSI report priority rule may be reused.

In this disclosure, a mapping order of CSI fields within a CSI report containing of multiple sub-configurations is proposed. According to the present disclosure, the first apparatus (such as, a terminal device) receives, from a second apparatus (such as, a network device), a CSI report configuration comprising: a first sub-configuration associated with a first priority reporting level; and a second sub-configuration associated with a second priority reporting level lower than the first priority reporting level; and transmits, to the second apparatus and based at least in part on the first and second first priority reporting levels, a CSI report associated with the first and second sub-configurations. In this way, impacts to the other CSI reporting caused by introducing the sub-configuration would be minimized.

In the present disclosure, a CSI report configuration associated with a plurality of sub-configurations may refer to: the CSI report configuration comprises a plurality of sub-configurations, or the CSI report configuration comprises a plurality of value groups/sets. In other words, each sub-configuration may be represented as an independent configuration, or be represented as a value group/set.

In the present disclosure, there are associations between the sub-configurations and CSI sub-configuration reports. In view of this, the discussions about the sub-configurations may be adaptively to the CSI sub-configuration reports, for example, prioritization/down-prioritization of sub-configurations may be replaced by prioritization/down-prioritization CSI sub-configuration reports. Merely for brevity, some similar contents are omitted herein.

It is to be understood that the scenario of NES would be especially benefit from the example embodiments of the present disclosure. However, it does not mean that the example embodiments of the present disclosure can be implemented only for this specific scenario. Actually, the example embodiments of the present disclosure may be implemented in any scenario where sub-configuration based method is applied. The present disclosure is not limited in this regard.

In the present disclosure,
➢ terms of "CSI associated with a sub-configuration", "CSI sub-configuration reports", "CSI sub-report", "CSI field" may be used interchangeably;
➢ terms of "ID", "index", "indicator" and "identifier" may be used interchangeably.

Principles and implementations of the present disclosure will be described in detail below with reference to the figures.

It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Environment

FIG. 1 illustrates an example communication environment 100 in which example embodiments of the present disclosure can be implemented. The communication environment 100 includes a first apparatus 110 and a second apparatus 120. A serving area provided by the second apparatus 120 is called a cell. The second apparatus 120 can provide one or more cells, for example, a cell 102 as illustrated in FIG. 1.

In some example embodiments, the first apparatus 110 may be comprised in a terminal device and the second apparatus 120 may be comprised in a network device serving the terminal apparatus.

In the following, for the purpose of illustration, some example embodiments are described with the first apparatus 110 operating as a terminal apparatus and the second apparatus 120 operating as a network apparatus. However, in some example embodiments, operations described in connection with a terminal apparatus may be implemented at a network apparatus or other apparatus, and operations described in connection with a network apparatus may be implemented at a terminal apparatus or other apparatus.

In some example embodiments, if the first apparatus 110 is a terminal apparatus and the second apparatus 120 is a network apparatus, a link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) apparatus (or a transmitter) and the first apparatus 110 is a receiving (RX) apparatus (or a receiver). In UL, the first apparatus 110 is a TX apparatus (or a transmitter) and the second apparatus 120 is a RX apparatus (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Work Principle and Example Signaling for Communication

Figure 2:
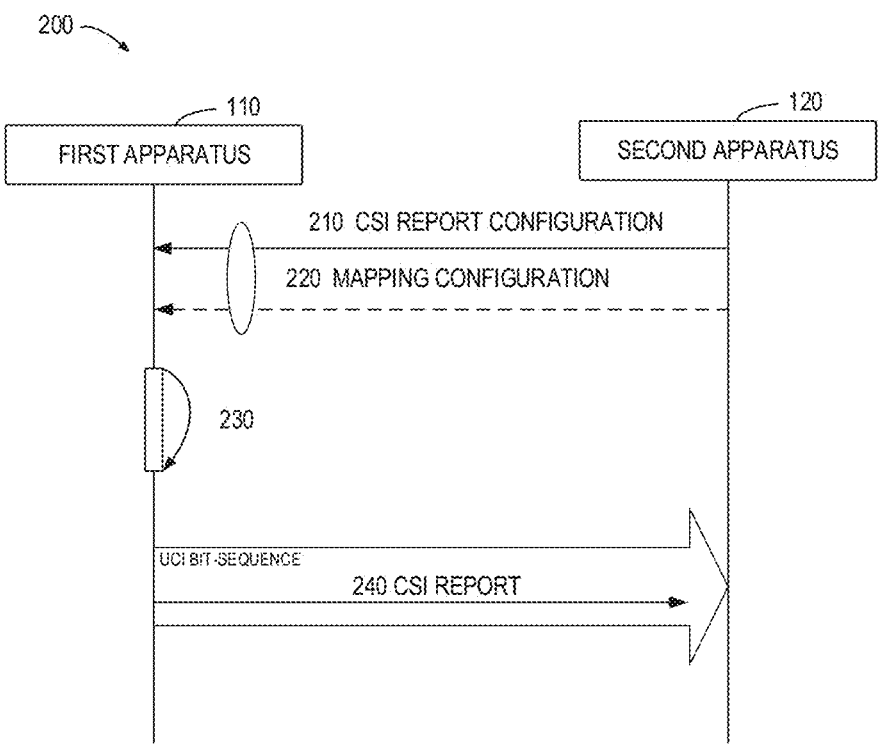
FIG. 2 illustrates a signaling chart of communication according to some example embodiments of the present disclosure.

Reference is made to FIG. 2, which illustrates a signaling flow 200 of communication in accordance with some embodiments of the present disclosure. For the purposes of discussion, the signaling flow 200 will be discussed with reference to FIG. 1, for example, by using the first apparatus 110 and the second apparatus 120.

It is to be understood that the operations at the first apparatus 110 and the second apparatus 120 should be coordinated. In other words, the second apparatus 120 and the first apparatus 110 should have common understanding about configurations, parameters and so on. Such common understanding may be implemented by any suitable interactions between the second apparatus 120 and the first apparatus 110 or both the second apparatus 120 and the first apparatus 110 applying the same rule/policy.

In the following, although some operations are described from a perspective of the first apparatus 110, it is to be understood that the corresponding operations should be performed by the second apparatus 120. Similarly, although some operations are described from a perspective of the second apparatus 120, it is to be understood that the corresponding operations should be performed by the first apparatus 110. Merely for brevity, some of the same or similar contents are omitted here.

In the example of FIG. 2, the first apparatus 110 may be a terminal apparatus and the second apparatus 120 may be a network apparatus.

In FIG. 2, the second apparatus 120 may support to be operated in an NES mode. In some embodiments, the second apparatus 120 may configure one CSI report configuration contains multiple CSI report sub-configurations to the first apparatus 110 via RRC signalling, where each sub-configuration may correspond to one spatial/power adaptation pattern.

In the following, a first part of the CSI report may refer to CSI part 1, which is un-omissible, while a second part of the CSI report may refer to CSI part 2, which is omissible.

In operation, the first apparatus 110 receives 210 a CSI report configuration from the second apparatus 120, where the report configuration comprising a first sub-configuration and a second sub-configuration.

In some example embodiments, the first sub-configuration is associated with a first priority reporting level and the second sub-configuration is associated with a second priority reporting level, and the second priority reporting level is lower than the first priority reporting level.

In some example embodiments, a first portion of the CSI corresponding to the first sub-configuration is associated with the first priority reporting level and a second portion of the CSI corresponding to the first sub-configuration is associated with the second priority reporting level, and the second priority reporting level is lower than the first priority reporting level.

Then, the first apparatus 110 transmits 240, to the second apparatus 120 and based at least in part on the first and second first priority reporting levels, a CSI report associated with at least one of the first sub-configuration or the second sub-configuration.

In some example embodiments, the first sub-configuration may be associated with a first spatial or power adaptation pattern, and the second sub-configuration may be associated with a second spatial or power adaptation pattern which is different from the first spatial or power adaptation pattern.

In some example embodiments, the CSI report configuration may be a periodic CSI reporting, or a MAC-CE based semi-persistent CSI reporting, and the CSI report may be carried on physical uplink control channel (PUCCH).

How to generate the CSI report associated with the first and second sub-configurations will be discussed in the following.

In some example embodiments, the first apparatus 110 may map 230 all the CSI corresponding to the second sub-configuration to a second part of the CSI report (i.e., CSI part 2).

In some example embodiments, the first apparatus 110 may map 230 all the CSI corresponding to the first sub-configuration to a first part of the CSI report (i.e., CSI part 1). Alternatively, in some example embodiments, the first apparatus 110 may map a first portion of the CSI corresponding to the first sub-configuration to the first part of the CSI report and map a second portion of the CSI corresponding to the first sub-configuration is mapped to a second part of the CSI report, where the first portion of the CSI corresponds to a first set of report quantities and the second portion of the CSI corresponds to a second set of report quantities.

In some example embodiments, the report quantity comprised in the first or second set of report quantities associates with one of the following:
- ➢ a wideband channel quality indicator (CQI),
- ➢ a subband CQI,
- ➢ a wideband precoding matrix indicator (PMI),
- ➢ a subband PMI,
- ➢ a CSI-RS resource indicator (CRI),
- ➢ a layer indicator (LI), or
- ➢ a rank indicator (RI).

In some example embodiments, the first apparatus 110 may receive 220, from the second apparatus 120, a UCI mapping configuration indicating at least one of the following:
- ➢ at least one down-prioritized sub-configuration with the second priority reporting level, the at least one down-prioritized sub-configuration comprising the second sub-configuration, or
- ➢ at least one UCI mapping rule implying the at least one down-prioritized sub-configuration.

In summary, according to some embodiments of the present disclosure, an UCI mapping configuration may be explicitly/implicitly configured/indicated by the second apparatus. The UCI mapping configuration may be associated with at least one of the following:
- ➢ which sub-configuration(s) is down-prioritized,
- ➢ which sub-configuration(s) is prioritized,
- ➢ which report quantity(ies) is down-prioritized),
- ➢ which report quantity(ies) is prioritized),
- ➢ which CSI sub-configuration report(s) is down-prioritized, or
- ➢ which CSI sub-configuration report(s) is prioritized.

In some example embodiments, the UCI mapping configuration may further indicate that: different CSI sub-configuration reports corresponding to different sub-configurations with a same priority reporting level are mapped to a UCI bit sequence according to an ascending or descending order of index of sub-configuration.

It is to be clarified that the UCI mapping configuration also may be defined as a default configuration. As one example, the UCI mapping configuration is pre-defined by the communication organization (such as 3GPP), or pre-defined by the network operator or service provider. In this way, no additional signaling exchanging is needed.

Figure 3A:
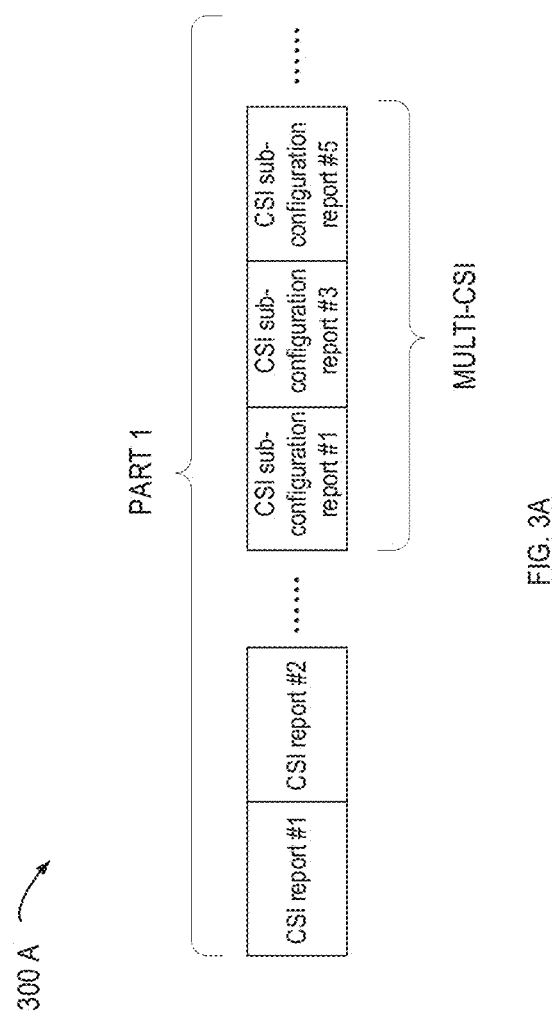
FIG. 3A illustrates an example structure of CSI part 1.

Merely for a better understanding about the above processes, some example embodiments will be discussed with reference to FIG. 3A, FIG. 3B and FIG. 4.

In some example embodiments, it is proposed to differentiate the UCI mapping for some of CSI sub-configuration reports corresponding to some of the (spatial/power) adaptation patterns configured via a CSI report configuration.

In some example embodiments, for periodic CSI reporting (or MAC CE based semi-persistent CSI reporting), some of the adaptation patterns may be prioritized by the implementation of the second apparatus 120 with UCI mapping to CSI Part 1, and the other adaptation patterns may be left with carrying in CSI Part 2. In this way, more capacity can be left for carrying the CSI Part 1 of other existing CSI report for other operation purpose.

In some example embodiments, the second apparatus 120 may be able to (explicitly/implicitly) configure the first apparatus 110 to down-prioritize some of the CSI sub-configurations (or some of the CSI sub-configuration reports) corresponding to some of the (spatial/power) adaptation patterns.

In some example embodiments, for the (spatial/power) adaptation patterns that are not to be down-prioritized, the corresponding CSI sub-configuration reports may be mapped to CSI Part 1 of the associated CSI report. Refer to FIG. 3A, which illustrates an example structure 300A of CSI part 1. In FIG. 3A, CSI sub-configuration #1,CSI sub-configuration #3 and CSI sub-configuration #5 are not down-prioritized.

Additionally, in some example embodiments, based on the implementation requirements for determination of (SD/power domain) adaptation pattern, the second apparatus 120 may also exactly configure the first apparatus 110 with which report quantities need to be captured in each of the CSI sub-configuration reports carried in CSI Part 1.

In some example embodiments, the wideband CQI information for first TB of sub-configurations in CSI Part 1 can be sufficient for gNB implementation determination and selection of (SD/PD) adaptation pattern. In this event, the subband differential CQI for first TB may be less important or additional nice-to-have information for the second apparatus 120 implementation determination and selection of (SD/PD) adaptation pattern, and it may be carried in the CSI Part 2. In this way, more capacity can be left for carrying the CSI Part 1 of other existing CSI report for other operation purpose.

In some example embodiments, for UE mapping of the CSI fields for adaptation patterns that are not to be down-prioritized, it is mapped in the order of sub-configurations index, e.g., from the lowest to the highest, or vice versa. Refer to FIGS. 3A and 3B, which illustrate an example structure 300A of CSI part 1 and an example structure 300B of CSI part 2. In FIGS. 3A and 3B, the CSI sub-configuration reports are mapped based on the order of sub-configurations index, i.e., from the lowest to the highest.

As one example embodiment, there are total of 6 sub-configurations for periodic CSI reporting, i.e., sub-configurations #0 to #5. The second apparatus 120 may (explicitly/implicitly) configure the first apparatus 110 to prioritize the CSI report of sub-configuration #0, #3 and #4, with increasing order of sub-configuration index, (and the down-prioritized CSI report of sub-configuration #1, #2 and #5. In this specific example embodiment, example CSI Part 1 and CSI Part 2 may be:

➢ CSI Part 1: Wideband CQI for first TB of sub-configuration #0; Wideband CQI for first TB of sub-configuration #3; Wideband CQI for first TB of sub-configuration #4;

➢ CSI Part 2: Wideband CQI for first TB of sub-configuration #1; Wideband CQI for first TB of sub-configuration #2; and Wideband CQI for first TB of sub-configuration #5.

In some example embodiments, for the (spatial/power) adaptation patterns that are indicated as down-prioritized, the corresponding CSI sub-configuration reports are mapped to CSI Part 2 of the associated CSI report.

In some example embodiments, all report quantities related to the down-prioritized CSI sub-configurations are mapped to CSI Part 2, i.e., following the legacy CSI field mapping order, and the remaining report quantities of the prioritized sub-configurations may be carried in CSI Part 1.

How does the UE generate the CSI reports for the sub-configurations mapping to different spatial and power adaptation patterns are discussed as below.

In some example embodiments, for the sub-configurations indicated as down-prioritized, the first apparatus 110 may derive the UCI bit sequence separately as indicated by the formulas below.

$$A^{(1)} = O^{ACK} + O^{SR} + O^{CSI-part1}$$

$$A^{(2)} = O^{CSI-part2} + A_{LP}^{(1)} + A_{LP}^{(2)}$$

$$A_{LP}^{(1)} = O_{LP}^{CSI-part1}$$

$$A_{LP}^{(2)} = O_{LP}^{CSI-part2}.$$

Where, $A^{(1)}$ refers to the bit sequence of CSI Part 1, $A^{(2)}$ refers to the bit sequence of CSI Part 2, $A_{LP}^{(1)}$ refers to the low-priority bit sequences corresponding to CSI part 1, $A_{LP}^{(2)}$ refers to the low-priority bit sequences corresponding to CSI part 2. Further, $O^{ACK}$ refers to a bit location of ACK, $O^{SR}$ refers to a bit location of SR, $O^{CSI-part1}$ refers to a bit location of CSI report corresponding to CSI part 1, $O^{CSI-part2}$ refers to a bit location of CSI report corresponding to CSI part 1, $O_{LP}^{CSI-part1}$ refers to a bit location of CSI report with low-priority corresponding to CSI part 1, $O_{LP}^{CSI-part2}$ refers to a bit location of CSI report with low-priority corresponding to CSI part 2.

If the report quantity requires the CSI to be split in 2 parts, the first apparatus 110 derives 2 low-priority bit sequences else a single bit sequence while considering only the specific sub-configurations marked as down-prioritized.

In some example embodiments, these low-priority UCI bits are then appended to the legacy CSI-part2 bit-sequence to get the final $A^{(2)}$ sequence.

The above mapping does not the impact the CSI report priority and hence the CSI report of any of the existing pattern with high priority, while allows the network to also obtain the CSI report of other patterns which might help with quick adaptation.

As one specific embodiment, the second apparatus 120 may trasnmits a RRC reconfiguration to the first apparatus 110, where RRC reconfiguration comprising a CSI-report configuration including CSI report of sub-configurations #1, #2 and #3. In this specific embodiment, sub-configurations #2 and #3 are down-prioritized.

The first apparatus 110 may measure the CSI for all sub-configurations #1, #2 and #3. Then, the first apparatus 110 report sub-configuration #1 as per legacy method and down prioritize the CSI sub-configuration reports for sub-configurations #2 and #3. The first apparatus 110 generates a separate bit sequence and append to the legacy sequency as final CSI report. Next, the CSI report with UCI bits pf down prioritized patterns appended to the end of the report is transmitted to the second apparatus 120.

Figure 4:
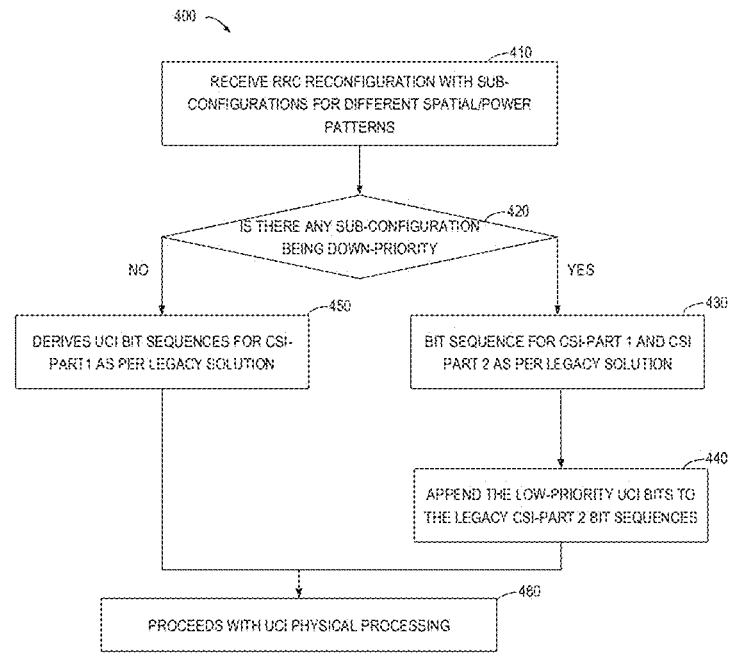
FIG. 4 illustrates a flowchart of a method implemented at a first apparatus according to some example embodiments of the present disclosure.

Reference is now made to FIG. 4, which illustrates a flowchart of a method 400 implemented at a first apparatus according to some example embodiments of the present disclosure.

At block 410, the first apparatus 110 receives RRC reconfiguration with sub-configurations for different spatial/power patterns.

At block 420, the first apparatus 110 determines is there any sub-configuration being down-priority. If yes, at block 430, the first apparatus 110 derives low-priority UCI bit sequence for CSI-part 1 and CSI part 2 as per legacy solution. At block 440, the first apparatus 110 appends the low-priority UCI bits to the legacy CSI-part 2 bit sequences. If not, at block 440, the first apparatus 110 derives UCI bit sequences for CSI-part1 as per legacy solution. At block 460, the first apparatus 110 proceeds with UCI physical processing.

With the above processes, in case of NES, although multiple sub-configurations are configured, as some sub-configurations may be down-prioritized, and thus more transmission capacity may be left for carrying other existing CSI report in the CSI Part 1.

Example Methods

Figure 5:
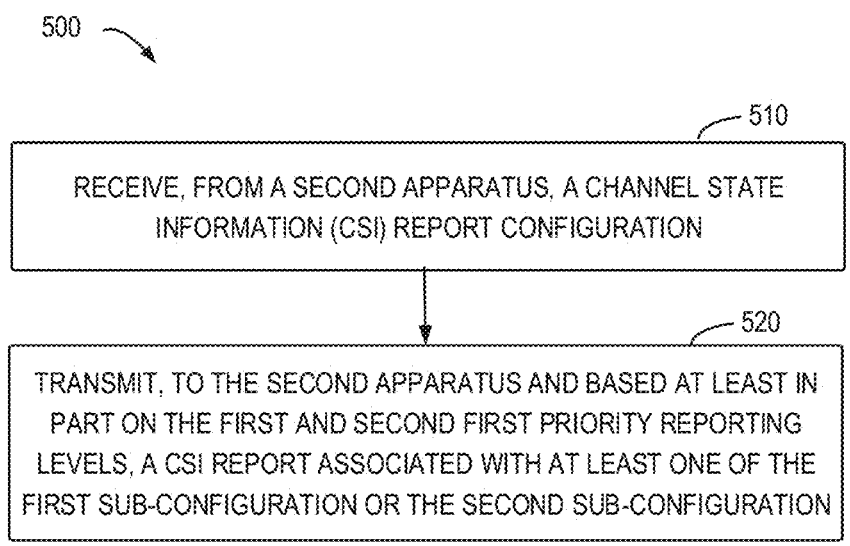
FIG. 5 illustrates a flowchart of a method implemented at a first device according to some example embodiments of the present disclosure.

FIG. 5 shows a flowchart of an example method 500 implemented at a first device in accordance with some example embodiments of the present disclosure. For the purpose of discussion, the method 500 will be described from the perspective of the first apparatus 110 in FIG. 1.

At block 510, the first apparatus receives, from a second apparatus, a channel state information (CSI) report configuration comprising: a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level.

At block 520, the first apparatus transmits, to the second apparatus and based at least in part on the first and second first priority reporting levels, a CSI report associated with at least one of the first sub-configuration or the second sub-configuration.

In some example embodiments, the first apparatus may map all the CSI corresponding to the first sub-configuration to a first part of the CSI report.

Alternatively, in some example embodiments, the first apparatus may map the first portion to the first part of the CSI report and map the second portion to a second part of the CSI report, wherein the first portion corresponds to a first set of report quantities and the second portion corresponds to a second set of report quantities.

In some example embodiments, the report quantity comprised in the first or second set of report quantities associates with one of the following: a wideband channel quality indicator (CQI), a subband CQI, a wideband precoding matrix indicator (PMI), a subband PMI, a CSI-RS resource indicator (CRI) a layer indicator (LI), or a rank indicator (RI).

In some example embodiments, the first apparatus may map all the CSI corresponding to the second sub-configuration to a second part of the CSI report.

In some example embodiments, the first apparatus may receive, from the second apparatus, an uplink control information (UCI) mapping configuration indicating at least one of the following: at least one down-prioritized sub-configuration with the second priority reporting level, the at least one down-prioritized sub-configuration comprising the second sub-configuration, or at least one UCI mapping rule implying the at least one down-prioritized sub-configuration.

In some example embodiments, the UCI mapping configuration further indicates that: different CSI sub-configuration reports corresponding to different sub-configurations with a same priority reporting level are mapped to a UCI bit sequence according to an ascending or descending order of index of sub-configuration.

In some example embodiments, the first sub-configuration is associated with a first spatial or power adaptation pattern, and the second sub-configuration is associated with a second spatial or power adaptation pattern different from the first spatial or power adaptation pattern.

In some example embodiments, the CSI report configuration is a periodic CSI reporting, or a MAC-CE based semi-persistent CSI reporting, and wherein the CSI report is carried on physical uplink control channel (PUCCH).

In some example embodiments, the first apparatus is a terminal apparatus and the second apparatus is a network apparatus.

Figure 6:
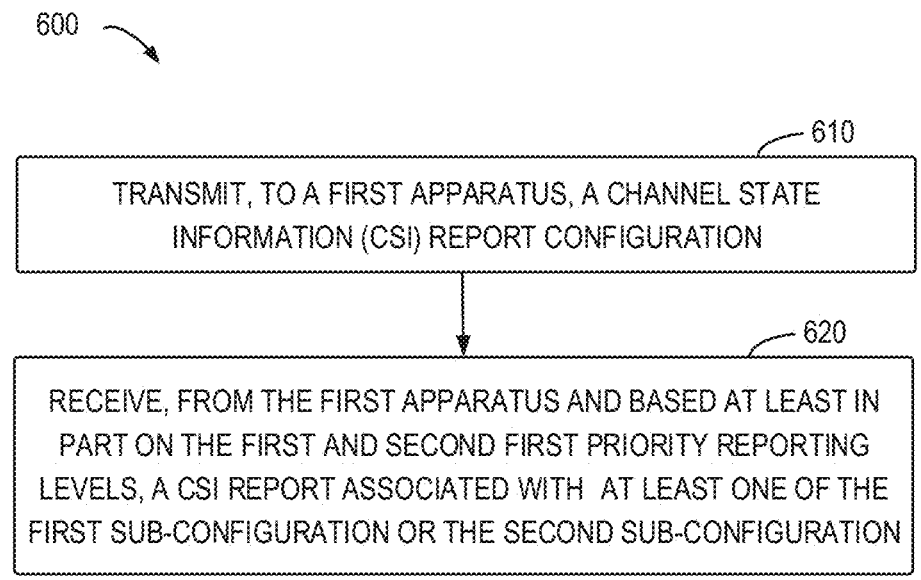
FIG. 6 illustrates a flowchart of a method implemented at a second device according to some example embodiments of the present disclosure.

FIG. 6 shows a flowchart of an example method 600 implemented at a second device in accordance with some example embodiments of the present disclosure. For the purpose of discussion, the method 600 will be described from the perspective of the second apparatus 120 in FIG. 1.

At block 610, the second apparatus transmits, to a first apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level.

At block 620, the second apparatus receives, from the first apparatus and based at least in part on the first and second first priority reporting levels, a CSI report associated with at least one of the first sub-configuration or the second sub-configuration.

In some example embodiments, all the CSI corresponding to the first sub-configuration is mapped to a first part of the CSI report, or wherein the first portion is mapped to the first part of the CSI report and the second portion is mapped to a second part of the CSI report, wherein the first portion corresponds to a first set of report quantities and the second portion corresponds to a second set of report quantities.

In some example embodiments, the report quantity comprised in the first or second set of report quantities associates with one of the following: a wideband channel quality indicator (CQI), a subband CQI, a wideband precoding matrix indicator (PMI), a subband PMI, a CSI-reference signal (RS) resource indicator (CRI), a layer indicator (LI), or a rank indicator (RI).

In some example embodiments, all the CSI corresponding to the second sub-configuration is mapped to a second part of the CSI report.

In some example embodiments, the second apparatus transmits, to the first apparatus, an uplink control information (UCI) mapping configuration indicating at least one of the following: at least one down-prioritized sub-configuration with the second priority reporting level, the at least one down-prioritized sub-configuration comprising the second sub-configuration, or at least one UCI mapping rule implying the at least one down-prioritized sub-configuration.

In some example embodiments, the UCI mapping configuration further indicates that: different CSI sub-configuration reports corresponding to different sub-configurations with a same priority reporting level are mapped to a UCI bit sequence according to an ascending or descending order of index of sub-configuration.

In some example embodiments, the first sub-configuration is associated with a first spatial or power adaptation pattern, and the second sub-configuration is associated with a second spatial or power adaptation pattern different from the first spatial or power adaptation pattern.

In some example embodiments, the CSI report configuration is a periodic CSI reporting or a medium access control control element (MAC-CE) based semi-persistent CSI reporting, and wherein the CSI report is carried on physical uplink control channel (PUCCH).

In some example embodiments, the first apparatus is a terminal apparatus and the second apparatus is a network apparatus.

Example Apparatus, Device and Medium

In some example embodiments, a first apparatus capable of performing any of the method 500 (for example, the first apparatus 110 in FIG. 1) may comprise means for performing the respective operations of the method 500. The means may be implemented in any suitable form. For example, the means may be implemented in a circuitry or software module. The first apparatus may be implemented as or included in the first apparatus 110 in FIG. 1.

In some example embodiments, the first apparatus comprises means for receiving, at a first apparatus and from a second apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and means for transmitting, to the second apparatus and based at least in part on the first and second first priority reporting levels, a CSI report associated with at least one of the first sub-configuration or the second sub-configuration.

In some example embodiments, the first apparatus further comprises: means for mapping all the CSI corresponding to the first sub-configuration to a first part of the CSI report, or means for mapping the first portion to the first part of the CSI report and mapping the second portion to a second part of the CSI report, wherein the first portion corresponds to a first set of report quantities and the second portion corresponds to a second set of report quantities.

In some example embodiments, the report quantity comprised in the first or second set of report quantities associates with one of the following: a wideband channel quality indicator (CQI), a subband CQI, a wideband precoding matrix indicator (PMI), a subband PMI, a CSI-RS resource indicator (CRI), a layer indicator (LI), or a rank indicator (RI).

In some example embodiments, the first apparatus further comprises: means for mapping all the CSI corresponding to the second sub-configuration to a second part of the CSI report.

In some example embodiments, the first apparatus further comprises: means for receiving, from the second apparatus, an uplink control information (UCI) mapping configuration indicating at least one of the following: at least one down-prioritized sub-configuration with the second priority reporting level, the at least one down-prioritized sub-configuration comprising the second sub-configuration, or at least one UCI mapping rule implying the at least one down-prioritized sub-configuration.

In some example embodiments, the UCI mapping configuration further indicates that: different CSI sub-configuration reports corresponding to different sub-configurations with a same priority reporting level are mapped to a UCI bit sequence according to an ascending or descending order of index of sub-configuration.

In some example embodiments, the first sub-configuration is associated with a first spatial or power adaptation pattern, and the second sub-configuration is associated with a second spatial or power adaptation pattern different from the first spatial or power adaptation pattern.

In some example embodiments, the CSI report configuration is a periodic CSI reporting, or a MAC-CE based semi-persistent CSI reporting, and wherein the CSI report is carried on physical uplink control channel (PUCCH).

In some example embodiments, the first apparatus is a terminal apparatus and the second apparatus is a network apparatus.

In some example embodiments, the first apparatus further comprises means for performing other operations in some example embodiments of the method 500 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 600 (for example, the second apparatus 120 in FIG. 1 may comprise means for performing the respective operations of the method 600. The means may be implemented in any suitable form. For example, the means may be implemented in a circuitry or software module. The second apparatus may be implemented as or included in the second apparatus 120 in FIG. 1.

In some example embodiments, the second apparatus comprises means for transmitting, at a second apparatus and to a first apparatus, a channel state information (CSI) report configuration comprising a first sub-configuration and a second sub-configuration, wherein the first sub-configuration is associated with a first priority reporting level and the second sub-configuration is associated with a second priority reporting level, or a first portion of the CSI corresponding to the first sub-configuration is associated with the first priority reporting level and a second portion of the CSI corresponding to the first sub-configuration is associated with the second priority reporting level, and wherein the second priority reporting level is lower than the first priority reporting level; and means for receiving, from the first apparatus and based at least in part on the first and second first priority reporting levels, a CSI report associated with at least one of the first sub-configuration or the second sub-configuration.

In some example embodiments, all the CSI corresponding to the first sub-configuration is mapped to a first part of the CSI report, or the first portion is mapped to the first part of the CSI report and the second portion is mapped to a second part of the CSI report, wherein the first portion corresponds to a first set of report quantities and the second portion corresponds to a second set of report quantities.

In some example embodiments, the report quantity comprised in the first or second set of report quantities associates with one of the following: a wideband channel quality indicator (CQI), a subband CQI, a wideband precoding matrix indicator (PMI), a subband PMI, a CSI-reference signal (RS) resource indicator (CRI), a layer indicator (LI), or a rank indicator (RI).

In some example embodiments, all the CSI corresponding to the second sub-configuration is mapped to a second part of the CSI report.

In some example embodiments, the second apparatus further comprises: means for transmitting, to the first apparatus, an uplink control information (UCI) mapping configuration indicating at least one of the following: at least one down-prioritized sub-configuration with the second priority reporting level, the at least one down-prioritized sub-configuration comprising the second sub-configuration, or at least one UCI mapping rule implying the at least one down-prioritized sub-configuration.

In some example embodiments, the UCI mapping configuration further indicates that: different CSI sub-configuration reports corresponding to different sub-configurations with a same priority reporting level are mapped to a UCI bit sequence according to an ascending or descending order of index of sub-configuration.

In some example embodiments, the first sub-configuration is associated with a first spatial or power adaptation pattern, and the second sub-configuration is associated with a second spatial or power adaptation pattern different from the first spatial or power adaptation pattern.

In some example embodiments, the CSI report configuration is a periodic CSI reporting or a medium access control control element (MAC-CE) based semi-persistent CSI reporting, and wherein the CSI report is carried on physical uplink control channel (PUCCH).

In some example embodiments, the first apparatus is a terminal apparatus and the second apparatus is a network apparatus.

In some example embodiments, the second apparatus further comprises means for performing other operations in some example embodiments of the method 600 or the second apparatus 120. In some example embodiments, the means comprises at least one processor; and at least one memory storing instructions that, when executed by the at least one processor, cause the performance of the second apparatus.

Figure 7:
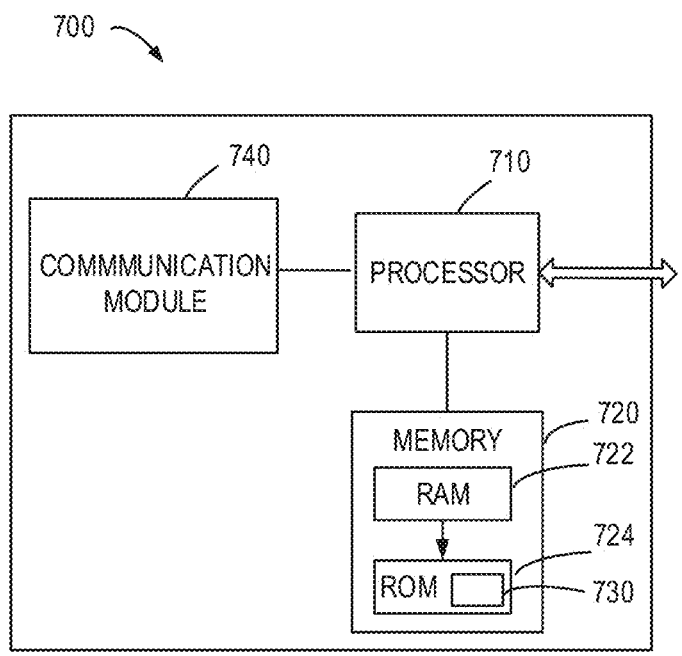
FIG. 7 illustrates a simplified block diagram of a device that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second apparatus 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
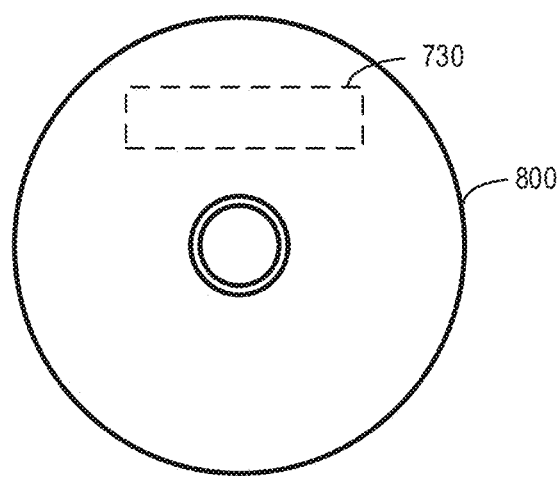
FIG. 8 illustrates a block diagram of an example computer readable medium in accordance with some example embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
   at least one processor; and
   at least one memory storing instructions that, when executed by the at least one processor, cause the first apparatus at least to:
   receive, from a second apparatus, a channel state information (CSI) report configuration comprising a first sub-configuration index of a first sub-configuration and a second sub-configuration index of a second sub-configuration, wherein each of the first sub-configuration and the second sub-configuration corresponds to a different spatial adaptation pattern,
      wherein the first sub-configuration is associated with a first priority reporting level and the second sub-configuration is associated with a second priority reporting level, and
      wherein the first sub-configuration index being less than the second sub-configuration index is indicative of the second priority reporting level being lower than the first priority reporting level;
   map a first portion of CSI to a first part of a CSI report, wherein the first portion corresponds to a first set of report quantities;
   map a second portion of the CSI to a second part of the CSI report, wherein the second portion corresponds to a second set of report quantities, wherein the first portion and the second portion are mapped based on an ascending order of the first sub-configuration index and the second sub-configuration index; and
   transmit, to the second apparatus and based at least in part on the first sub-configuration index and the second sub-configuration index, the CSI report associated with at least one of the first sub-configuration or the second sub-configuration.

2. The first apparatus of claim 1, wherein the report quantity comprised in the first or second set of report quantities associates with one of the following:
   a wideband channel quality indicator (CQI),
   a subband CQI,
   a wideband precoding matrix indicator (PMI),
   a subband PMI,
   a CSI-reference signal (RS) resource indicator (CRI),
   a layer indicator (LI), or
   a rank indicator (RI).

3. The first apparatus of claim 1, wherein the first apparatus is further caused to:
   map all the CSI corresponding to the second sub-configuration to a second part of the CSI report.

4. The first apparatus of claim 1, wherein the first apparatus is further caused to:
receive, from the second apparatus, an uplink control information (UCI) mapping configuration indicating at least one of the following:
at least one down-prioritized sub-configuration with the second priority reporting level, the at least one down-prioritized sub-configuration comprising the second sub-configuration, or
at least one UCI mapping rule implying the at least one down-prioritized sub-configuration.

5. The first apparatus of claim 4, wherein the UCI mapping configuration further indicates that:
different CSI sub-configuration reports corresponding to different sub-configurations with a same priority reporting level are mapped to a UCI bit sequence according to an ascending or descending order of index of sub-configuration.

6. The first apparatus of claim 1, wherein the first sub-configuration is associated with a first spatial or power adaptation pattern, and the second sub-configuration is associated with a second spatial or power adaptation pattern different from the first spatial or power adaptation pattern.

7. The first apparatus of claim 1, wherein the CSI report configuration is a periodic CSI reporting, or a medium access control control element (MAC-CE) based semi-persistent CSI reporting,
and wherein the CSI report is carried on physical uplink control channel (PUCCH).

8. The first apparatus of claim 1, wherein the first apparatus is a terminal apparatus and the second apparatus is a network apparatus.

9. A second apparatus comprising:
at least one processor; and
at least one memory storing instructions that, when executed by the at least one processor, cause the second apparatus at least to:
transmit, to a first apparatus, a channel state information (CSI) report configuration comprising a first sub-configuration index of a first sub-configuration and a second sub-configuration index of a second sub-configuration, wherein each of the first sub-configuration and the second sub-configuration corresponds to a different spatial adaptation pattern,
wherein the first sub-configuration is associated with a first priority reporting level and the second sub-configuration is associated with a second priority reporting level, and
wherein the first sub-configuration index being less than the second sub-configuration index is indicative of the second priority reporting level being lower than the first priority reporting level; and
receive, from the first apparatus and based at least in part on the first sub-configuration index and the second sub-configuration index, a CSI report associated with at least one of the first sub-configuration or the second sub-configuration,
wherein a first portion of CSI is mapped to a first part of the CSI report and a second portion of the CSI is mapped to a second part of the CSI report,
wherein the first portion corresponds to a first set of report quantities and the second portion corresponds to a second set of report quantities, and
wherein the first portion and the second portion are mapped based on an ascending order of the first sub-configuration index and the second sub-configuration index.

10. The second apparatus of claim 9, wherein the report quantity comprised in the first or second set of report quantities associates with one of the following:
a wideband channel quality indicator (CQI),
a subband CQI,
a wideband precoding matrix indicator (PMI),
a subband PMI,
a CSI-reference signal (RS) resource indicator (CRI),
a layer indicator (LI), or
a rank indicator (RI).

11. The second apparatus of claim 9, wherein all the CSI corresponding to the second sub-configuration is mapped to a second part of the CSI report.

12. The second apparatus of claim 9, wherein the second apparatus is further caused to:
transmit, to the first apparatus, an uplink control information (UCI) mapping configuration indicating at least one of the following:
at least one down-prioritized sub-configuration with the second priority reporting level, the at least one down-prioritized sub-configuration comprising the second sub-configuration, or
at least one UCI mapping rule implying the at least one down-prioritized sub-configuration.

13. The second apparatus of claim 12, wherein the UCI mapping configuration further indicates that:
different CSI sub-configuration reports corresponding to different sub-configurations with a same priority reporting level are mapped to a UCI bit sequence according to an ascending or descending order of index of sub-configuration.

14. The second apparatus of claim 9, wherein the first sub-configuration is associated with a first spatial or power adaptation pattern, and the second sub-configuration is associated with a second spatial or power adaptation pattern different from the first spatial or power adaptation pattern.

15. The second apparatus of claim 9, wherein the CSI report configuration is a periodic CSI reporting, or a medium access control control element (MAC-CE) based semi-persistent CSI reporting,
and wherein the CSI report is carried on physical uplink control channel (PUCCH).

16. The second apparatus of claim 9, wherein the first apparatus is a terminal apparatus and the second apparatus is a network apparatus.

17. A method comprising:
receiving, at a first apparatus and from a second apparatus, a channel state information (CSI) report configuration comprising a first sub-configuration index of a first sub-configuration and a second sub-configuration index of a second sub-configuration, wherein each of the first sub-configuration and the second sub-configuration corresponds to a different spatial adaptation pattern,
wherein the first sub-configuration is associated with a first priority reporting level and the second sub-configuration is associated with a second priority reporting level, and
wherein the first sub-configuration index being less than the second sub-configuration index is indicative of the second priority reporting level being lower than the first priority reporting level;
mapping a first portion of CSI to a first part of a CSI report, wherein the first portion corresponds to a first set of report quantities;
mapping a second portion of the CSI to a second part of the CSI report, wherein the second portion corresponds to a second set of report quantities, wherein the first portion and the second portion are mapped based on an ascending order of the first sub-configuration index and the second sub-configuration index; and transmitting, to the second apparatus and based at least in part on the first sub-configuration index and the second sub-configuration index, the CSI report associated with at least one of the first sub-configuration or the second sub-configuration.

18. A method comprising:

transmitting, at a second apparatus and to a first apparatus, a channel state information (CSI) report configuration comprising a first sub-configuration index of a first sub-configuration and a second sub-configuration index of a second sub-configuration, wherein each of the first sub-configuration and the second sub-configuration corresponds to a different spatial adaptation pattern, wherein the first sub-configuration is associated with a first priority reporting level and the second sub-configuration is associated with a second priority reporting level, and wherein the first sub-configuration index being less than the second sub-configuration index is indicative of the second priority reporting level being lower than the first priority reporting level; and receiving, from the first apparatus and based at least in part on the first sub-configuration index and the second sub-configuration index, a CSI report associated with at least one of the first sub-configuration or the second sub-configuration, wherein a first portion of CSI is mapped to a first part of the CSI report and a second portion of the CSI is mapped to a second part of the CSI report, wherein the first portion corresponds to a first set of report quantities and the second portion corresponds to a second set of report quantities, and wherein the first portion and the second portion are mapped based on an ascending order of the first sub-configuration index and the second sub-configuration index.

* * * * *